US009771116B2

(12) United States Patent
Marko

(10) Patent No.: US 9,771,116 B2
(45) Date of Patent: Sep. 26, 2017

(54) THREE WHEELED VEHICLE

(71) Applicant: Polaris Industries Inc., Medina, MN (US)

(72) Inventor: Shane W. Marko, Turtle Lake, WI (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 15/043,335

(22) Filed: Feb. 12, 2016

(65) Prior Publication Data

US 2017/0233022 A1    Aug. 17, 2017

(51) Int. Cl.
| B62D 3/12 | (2006.01) |
| B62K 5/05 | (2013.01) |
| B62K 11/04 | (2006.01) |
| B62K 5/08 | (2006.01) |
| B62K 21/00 | (2006.01) |
| B62D 5/04 | (2006.01) |
| B60K 11/04 | (2006.01) |

(52) U.S. Cl.
CPC ............... B62K 5/05 (2013.01); B60K 11/04 (2013.01); B62D 5/0442 (2013.01); B62K 5/08 (2013.01); B62K 11/04 (2013.01); B62K 21/00 (2013.01); *B62D 3/12* (2013.01)

(58) Field of Classification Search
CPC combination set(s) only.
See application file for complete search history.

(56) References Cited

U.S. PATENT DOCUMENTS

| 4,164,262 A * | 8/1979 | Skatsche | B60K 11/04 123/195 C |
| 4,592,437 A * | 6/1986 | Holm | F01P 11/12 160/105 |
| 4,604,974 A * | 8/1986 | Watanabe | F01P 11/10 123/41.01 |
| 5,219,016 A * | 6/1993 | Bolton | B60H 1/3227 165/140 |
| 5,271,473 A * | 12/1993 | Ikeda | B60K 11/04 180/68.4 |
| 6,189,492 B1 * | 2/2001 | Brown | B60S 1/50 123/41.49 |

(Continued)

FOREIGN PATENT DOCUMENTS

| CA | 2924270 A1 * | 3/2015 | ............ B62K 5/027 |
| DE | 102007024746 | 11/2008 | |

(Continued)

OTHER PUBLICATIONS

International Search Report issued by the International Searching Authority, dated Jun. 12, 2017, for related International Patent Application No. PCT/US2017/017609; 4 pages.

(Continued)

*Primary Examiner* — Nicole Verley
(74) *Attorney, Agent, or Firm* — Faegre Baker Daniels LLP

(57) ABSTRACT

A three wheeled vehicle is disclosed having a radiator positioned forward of an engine and coupled to the engine for cooling the engine. A front radiator shroud is positioned over the radiator on a front side and a rear radiator shroud is positioned over the radiator on a rear side. The rear radiator shroud has a rear baffle plate directing air downwardly and under the operator's compartment.

18 Claims, 17 Drawing Sheets

(56) References Cited

U.S. PATENT DOCUMENTS

| | | | | |
|---|---|---|---|---|
| 6,192,838 | B1* | 2/2001 | Matsuo | B60K 11/08 123/41.01 |
| 6,435,264 | B1* | 8/2002 | Konno | B60K 11/04 123/41.49 |
| 7,331,413 | B2* | 2/2008 | Okai | B62D 25/084 180/68.1 |
| 7,603,968 | B2* | 10/2009 | Pantow | B60K 11/02 123/41.04 |
| 8,540,043 | B2* | 9/2013 | Mehlos | B60K 13/02 180/68.1 |
| 8,936,121 | B2* | 1/2015 | Vacca | B60K 11/04 165/44 |
| 2001/0024042 | A1* | 9/2001 | Usui | B62J 27/00 293/115 |
| 2003/0168270 | A1* | 9/2003 | Maeda | B62D 25/084 180/68.4 |
| 2003/0221891 | A1* | 12/2003 | Fecteau | B62J 1/12 180/210 |
| 2005/0217909 | A1* | 10/2005 | Guay | B60K 11/04 180/68.4 |
| 2005/0257990 | A1 | 11/2005 | Shimizu | |
| 2007/0119395 | A1* | 5/2007 | Nagano | F01P 11/10 123/41.65 |
| 2008/0017138 | A1* | 1/2008 | Rogg | B60K 11/04 123/41.05 |
| 2012/0323448 | A1 | 12/2012 | Charnesky | |
| 2014/0299396 | A1* | 10/2014 | Tajima | B60K 11/04 180/68.1 |
| 2015/0122567 | A1* | 5/2015 | Marois | B62K 5/027 180/210 |
| 2016/0318387 | A1* | 11/2016 | Kuhn | B60K 11/04 |

FOREIGN PATENT DOCUMENTS

| | | | |
|---|---|---|---|
| DE | 102012015602 | 2/2014 | |
| EP | 2174818 | 4/2010 | |
| GB | 2080219 A * | 2/1982 | ............ B60K 11/04 |
| WO | WO 90/03298 | 4/1990 | |

OTHER PUBLICATIONS

Written Opinion of the International Searching Authority, dated Jun. 12, 2017, for related International Patent Application No. PCT/US2017/017609; 6 pages.

* cited by examiner

THREE WHEELED VEHICLE

BACKGROUND

The present disclosure relates to a three wheeled street worthy vehicle.

Three wheeled vehicles are known, for example see U.S. Pat. Nos. 7,648,148 and 7,464,781, the subject matter of which is incorporated herein by reference.

The vehicles depicted therein are straddle type vehicles. Side by side vehicles are also known; for example, see the Campagna T-Rex and V-13R vehicles. The subject matter of these vehicles is incorporated herein by reference.

The vehicle described herein is of the type shown and claimed in U.S. Pat. D689,794; 8,544,587; 8,695,746; 9,004,214; and US Publication US 2016-0010730 A1, the subject matter of which is incorporated herein by reference.

SUMMARY

In a first embodiment, a vehicle comprises two front wheels; at least one rear wheel; a frame supported by the two front wheels and the at least one rear wheel; an operator's compartment comprising side by side seats; an engine supported by the frame and positioned forward of the operator's compartment; a radiator positioned forward of the engine and coupled to the engine for cooling the engine; a front radiator shroud positioned over the radiator on a front side thereof; and a rear radiator shroud positioned over the radiator on a rear side thereof, the rear radiator shroud having a rear baffle plate directing air downwardly and under the operators compartment.

The vehicle may have the radiator coupled to the frame and the rear radiator shroud is coupled to the radiator. The vehicle may further include an electric power steering unit wherein a rack and pinion portion extends within the rear radiator shroud. The electric power steering unit may also include tie rod ends that extend from the rack and pinion portion and through the rear radiator shroud. The electric power steering unit may also include an electric motor positioned at one end of the rack and pinion portion. The rear radiator shroud may conform to the electric power steering unit. The frame may include upper and lower longitudinally extending tubular portions which flank the radiator, and a wall portion extending vertically between the upper and lower tubular portions, where the tie rods extend though openings in the wall portions.

In another embodiment, a vehicle comprises two front wheels; at least one rear wheel; a frame supported by the two front wheels and the at least one rear wheel; an operator's compartment comprising side by side seats; an engine supported by the frame and positioned forward of the operator's compartment; a front body portion surrounding the engine and the frame, the front body portion having an opening therethrough adjacent a forwardmost point of the front body portion; a radiator positioned forward of the engine and rearward of the opening, and coupled to the engine for cooling the engine; and a rear radiator shroud positioned over the radiator on a rear side thereof, the rear radiator shroud having a rear baffle plate directing air downwardly and under the operators compartment.

The vehicle may further include a front radiator shroud positioned over the radiator on a front side thereof and rearward of the opening. The vehicle may include a front grate which allows air through the opening and into the front radiator shroud. The rear baffle plate of the rear radiator shroud may include a lower rearwardly angled portion. The lower rearwardly angled portion may have a rearwardmost point which is rearward of a forwardmost point of the engine. The radiator may be coupled to the frame and the rear radiator shroud coupled to the radiator.

The vehicle may include an electric power steering unit wherein a rack and pinion portion extends within the rear radiator shroud. The electric power steering unit may also include tie rod ends that extend from the rack and pinion portion and through the rear radiator shroud. The electric power steering unit may further include an electric motor positioned at one end of the rack and pinion portion. The vehicle may have the frame comprised of upper and lower longitudinally extending tubular portions which flank the radiator, and a wall portion extending vertically between the upper and lower tubular portions, the tie rods extending though openings in the wall portions.

DETAILED DESCRIPTION

Figure 1:
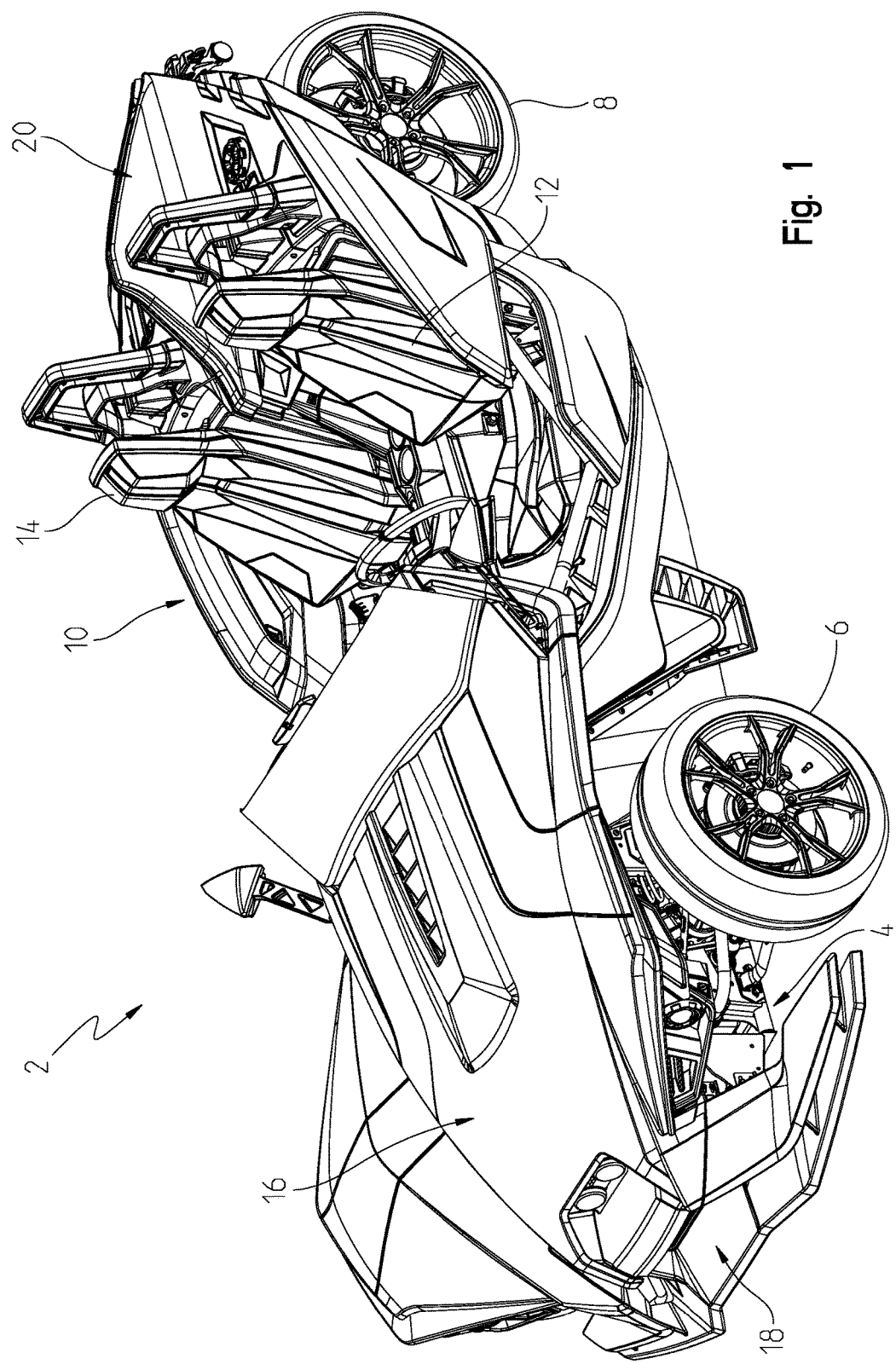
FIG. 1 is a front left perspective view of the three-wheeled vehicle of the present disclosure.
Figure 2:
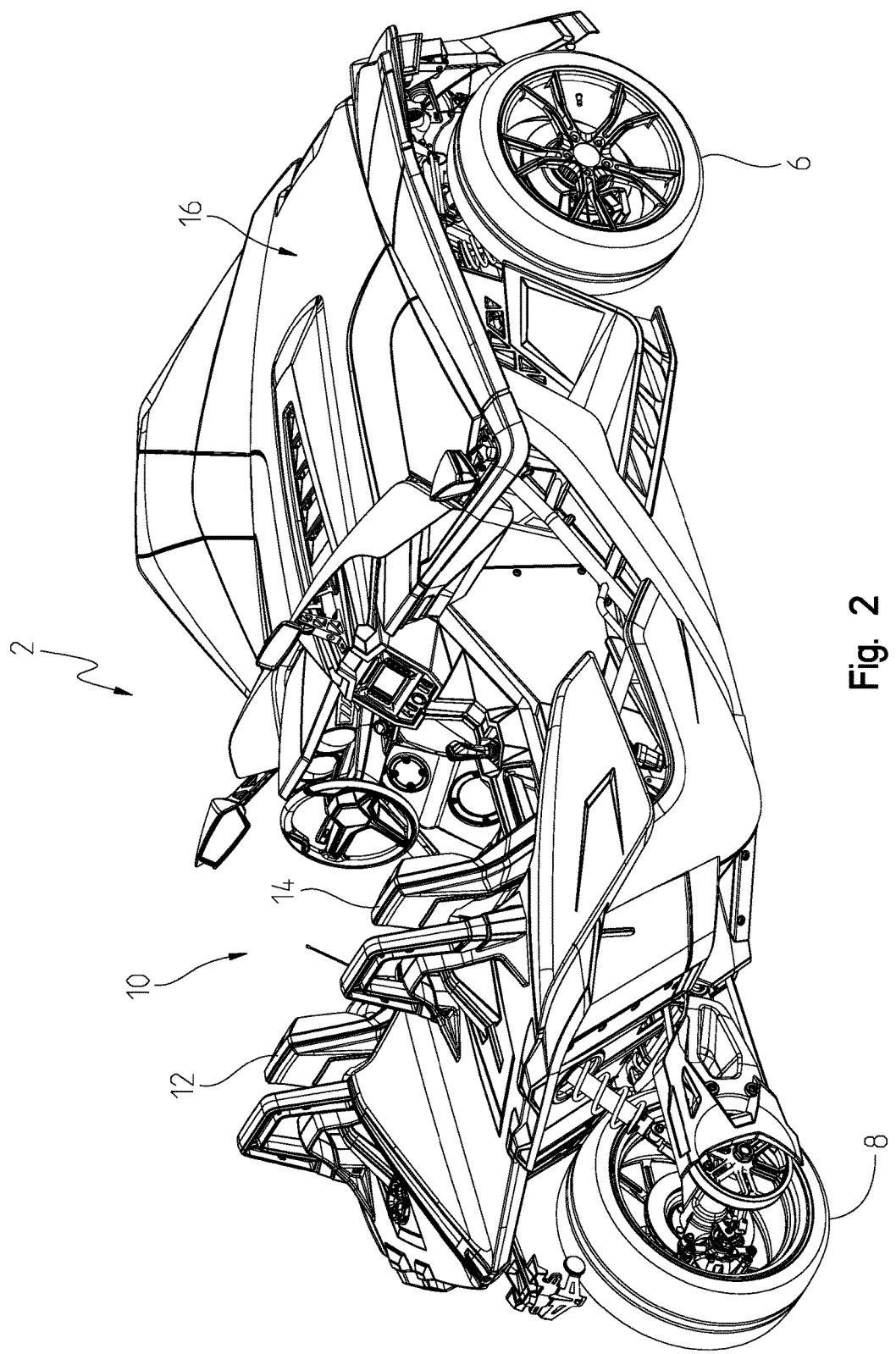
FIG. 2 is a right rear perspective view of the three-wheeled vehicle of the present disclosure.
Figure 3:
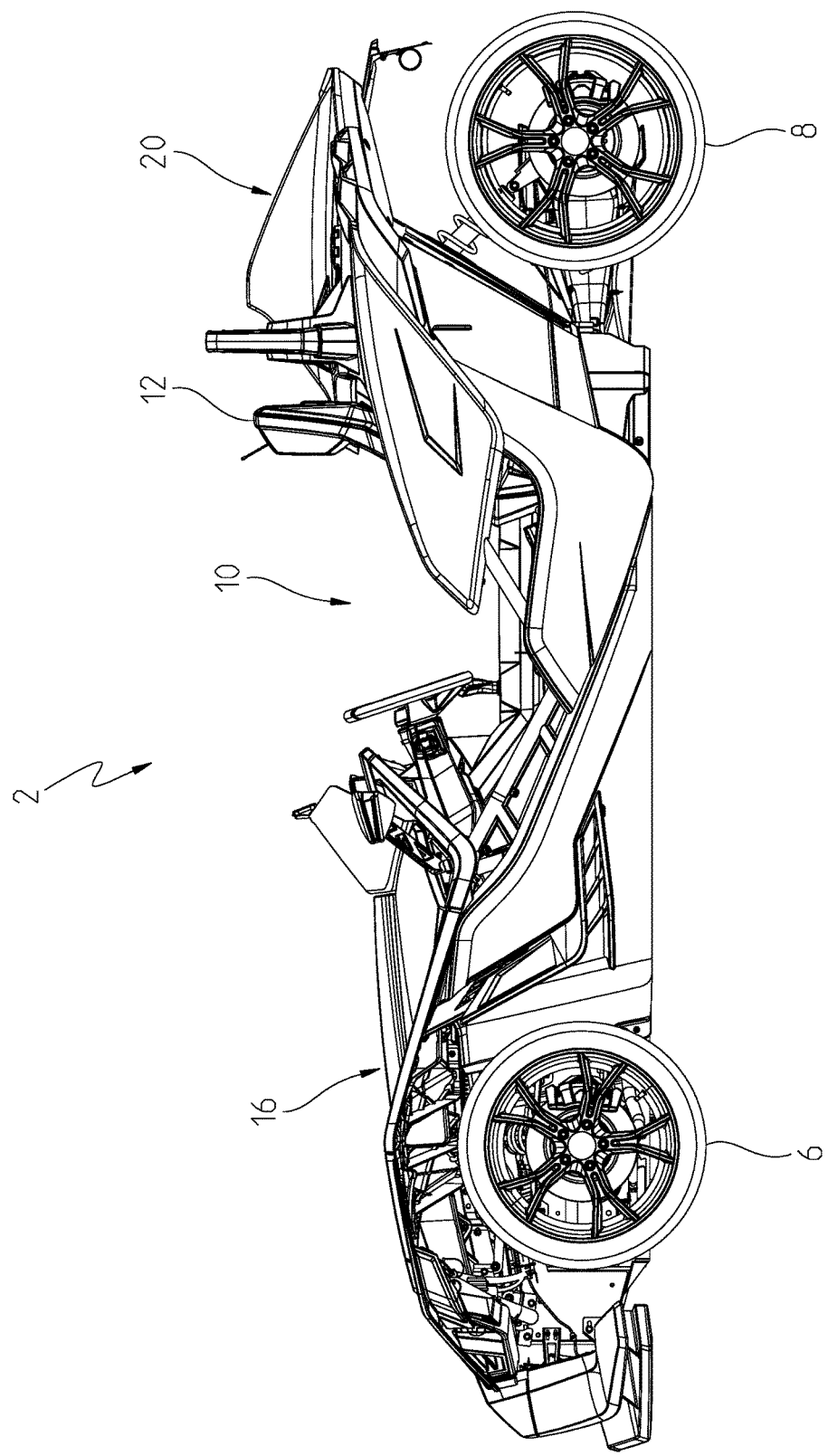
FIG. 3 is a left side view of the vehicle of FIG. 1.
Figure 4:
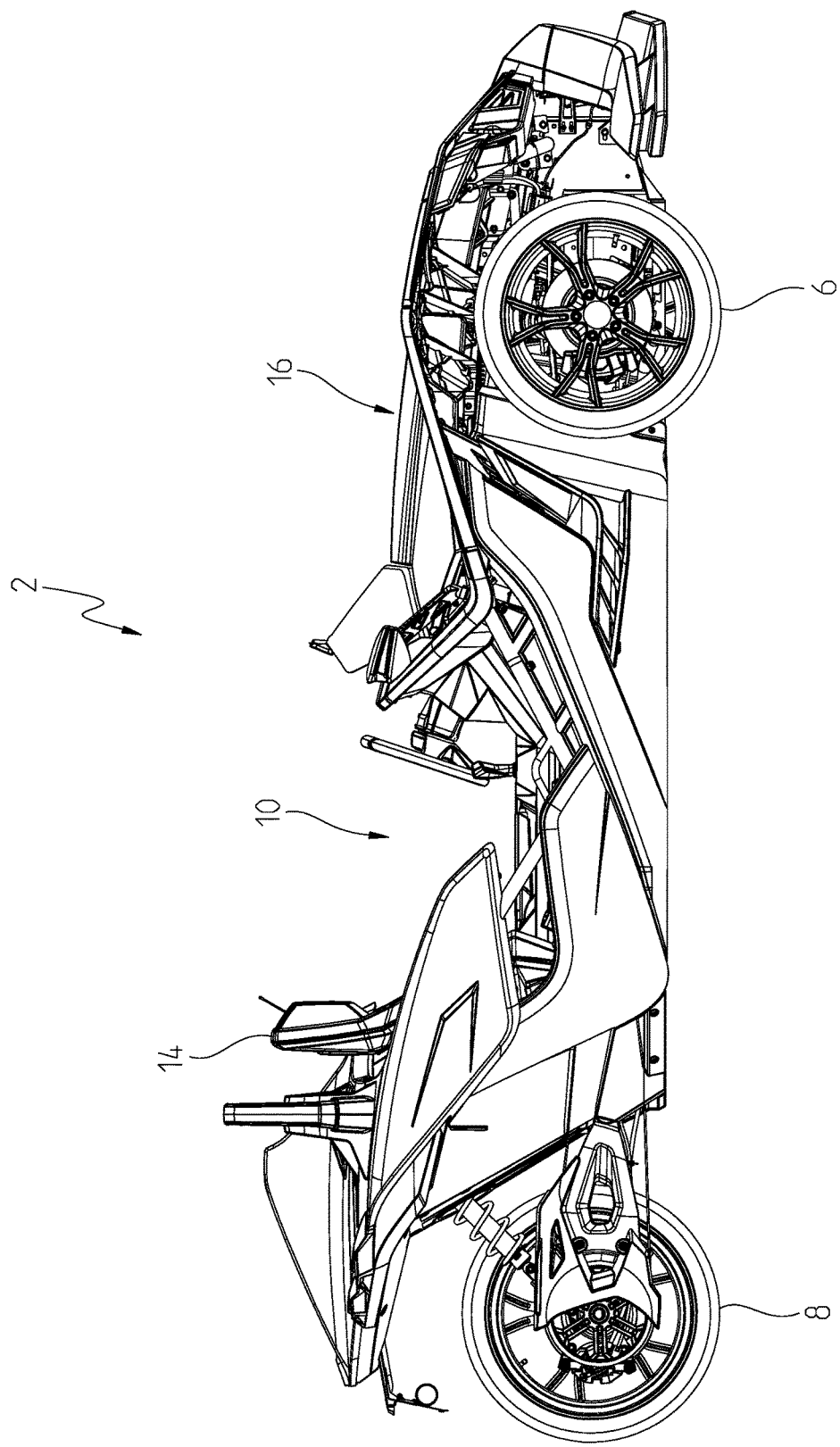
FIG. 4 is a right side view of the vehicle of FIG. 1.
Figure 5:
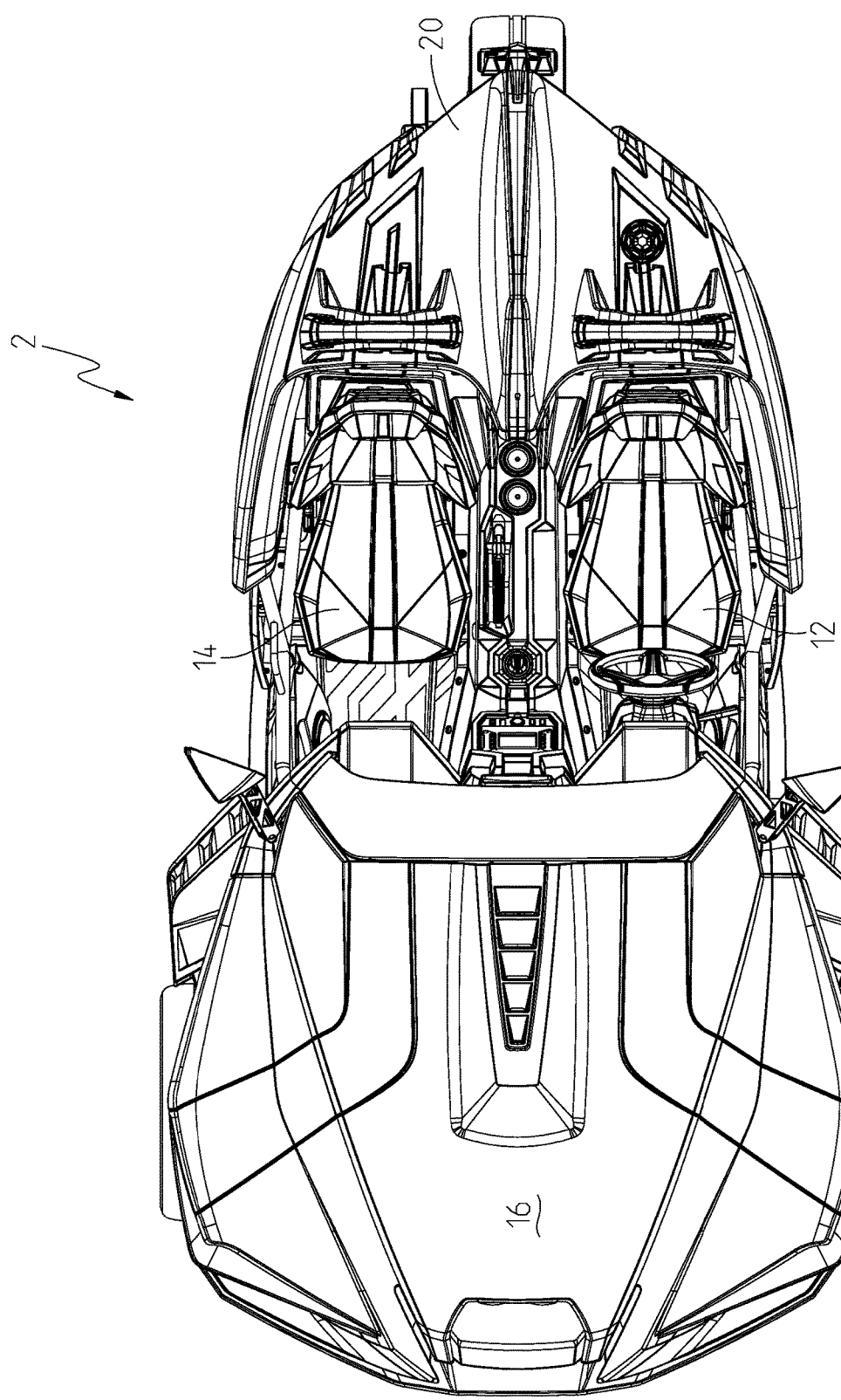
FIG. 5 is a top view of the vehicle of FIG. 1.
Figure 6:
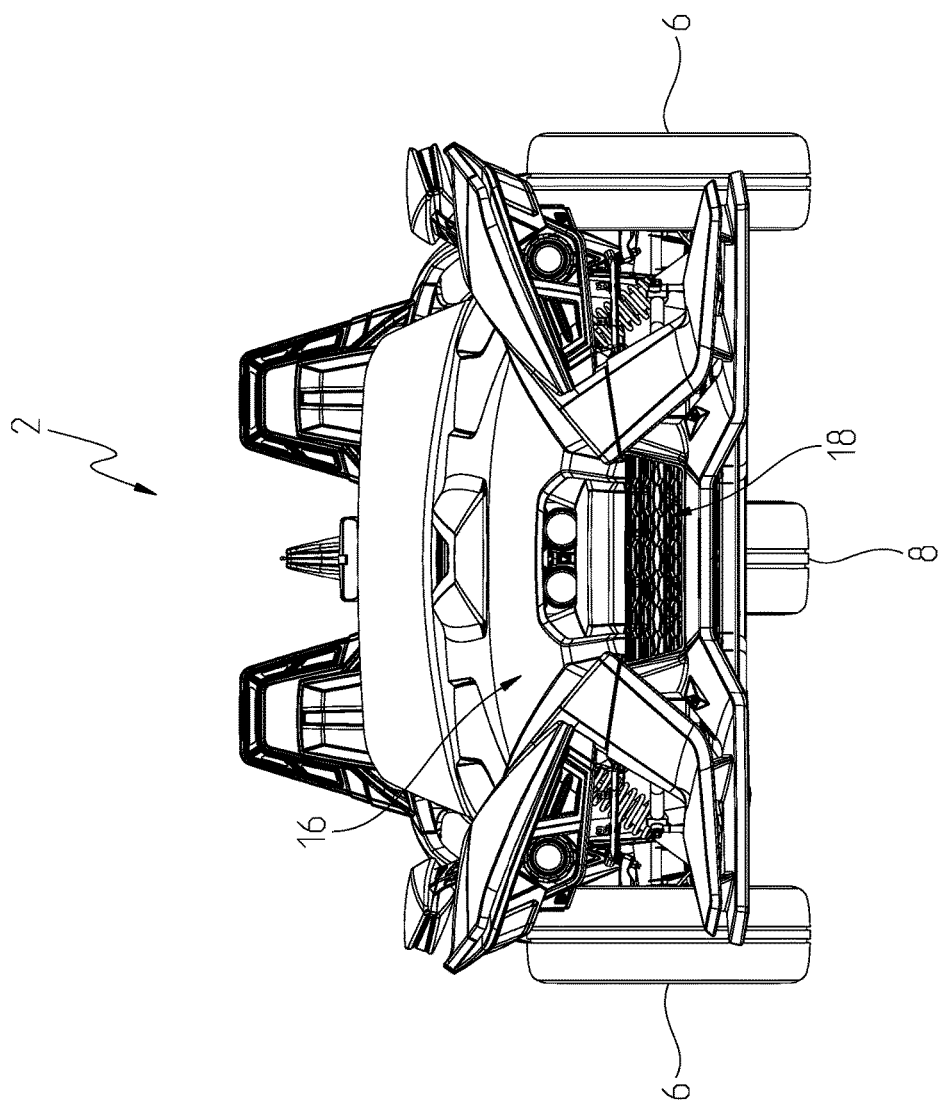
FIG. 6 is a front view of the vehicle of FIG. 1.
Figure 7:
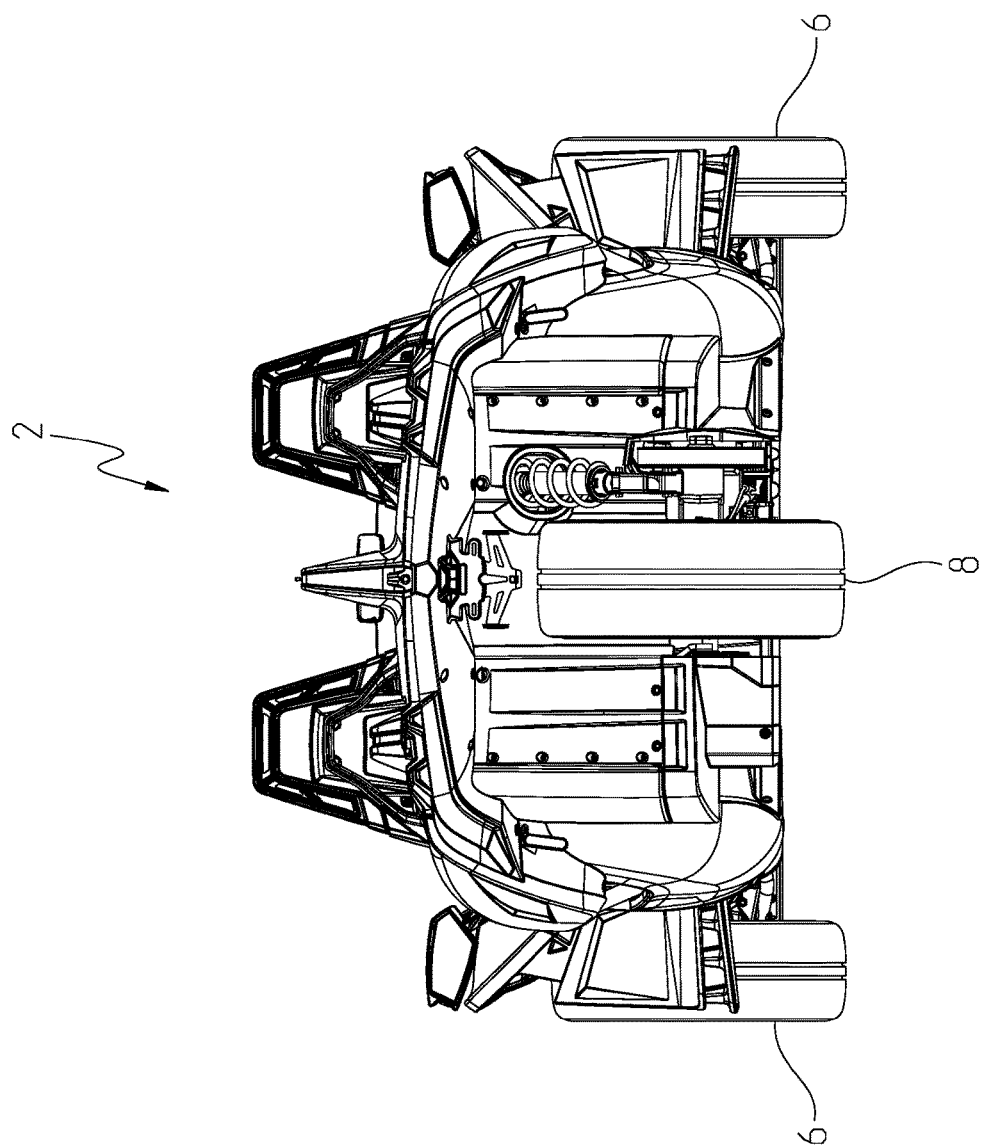
FIG. 7 is a rear view of the vehicle of FIG. 1.

With reference first to FIGS. 1-7, a three-wheeled vehicle is shown generally at 2. Vehicle 2 is comprised of a frame 4 supported by front wheels 6 and a single rear-wheel 8. Vehicle 2 is classified as a motorcycle that has side-by-side seating provided in an operator's compartment 10 which includes a driver's seat 12 and a passenger's seat 14. Vehicle 2 also includes a front body portion 16 including an air intake 18 for cooling purposes, as described herein. Vehicle 2 further includes a rear body portion 20 supported by the single rear wheel 8.

Figure 8:
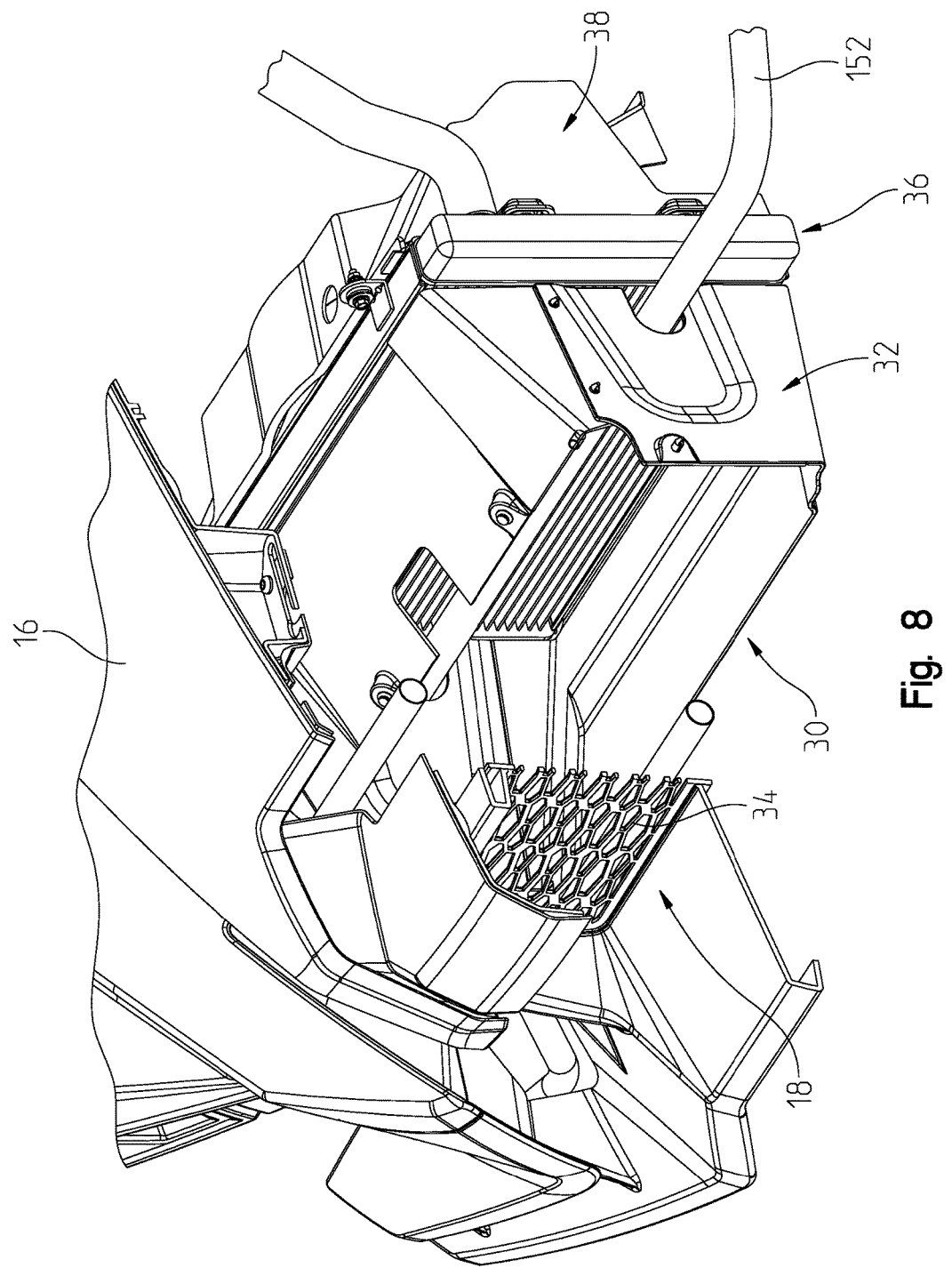
FIG. 8 is a fragmented cross sectional view of a front end of the vehicle of FIG. 1.

With reference now to FIGS. 8-15, a cooling system 30 of the vehicle 2 will be described. With reference first to FIG. 8, the cooling system 30 includes a front shroud 32, positioned directly rearward of a front grate 34, a radiator 36 and a rear shroud 38. It should be appreciated that air enters front shroud 32 upon movement of the vehicle through grate 34 and passes across the radiator 36 for cooling purposes, as described herein.

Figure 9:
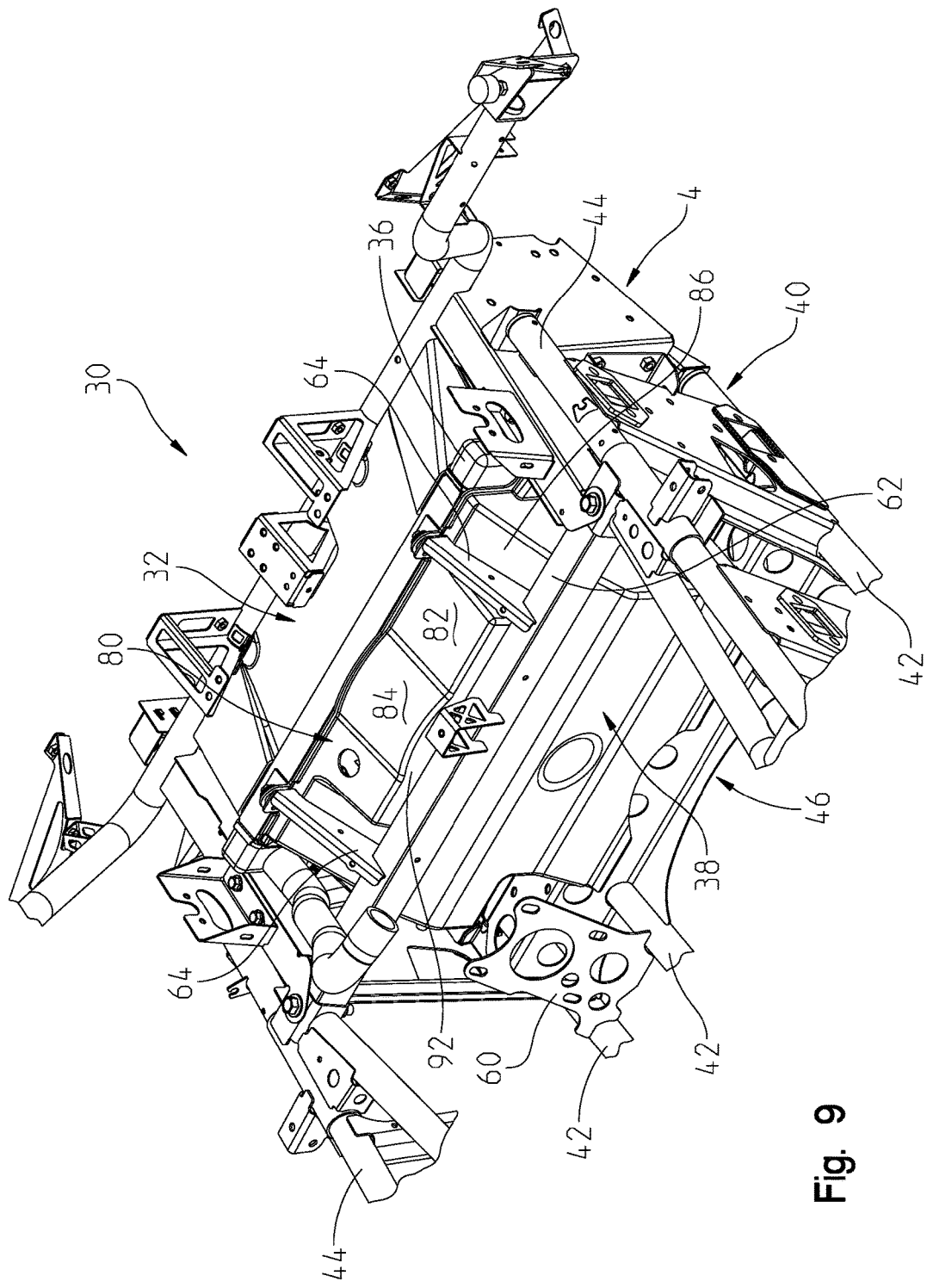
FIG. 9 is a right rear perspective view of the front frame assembly.
Figure 10:
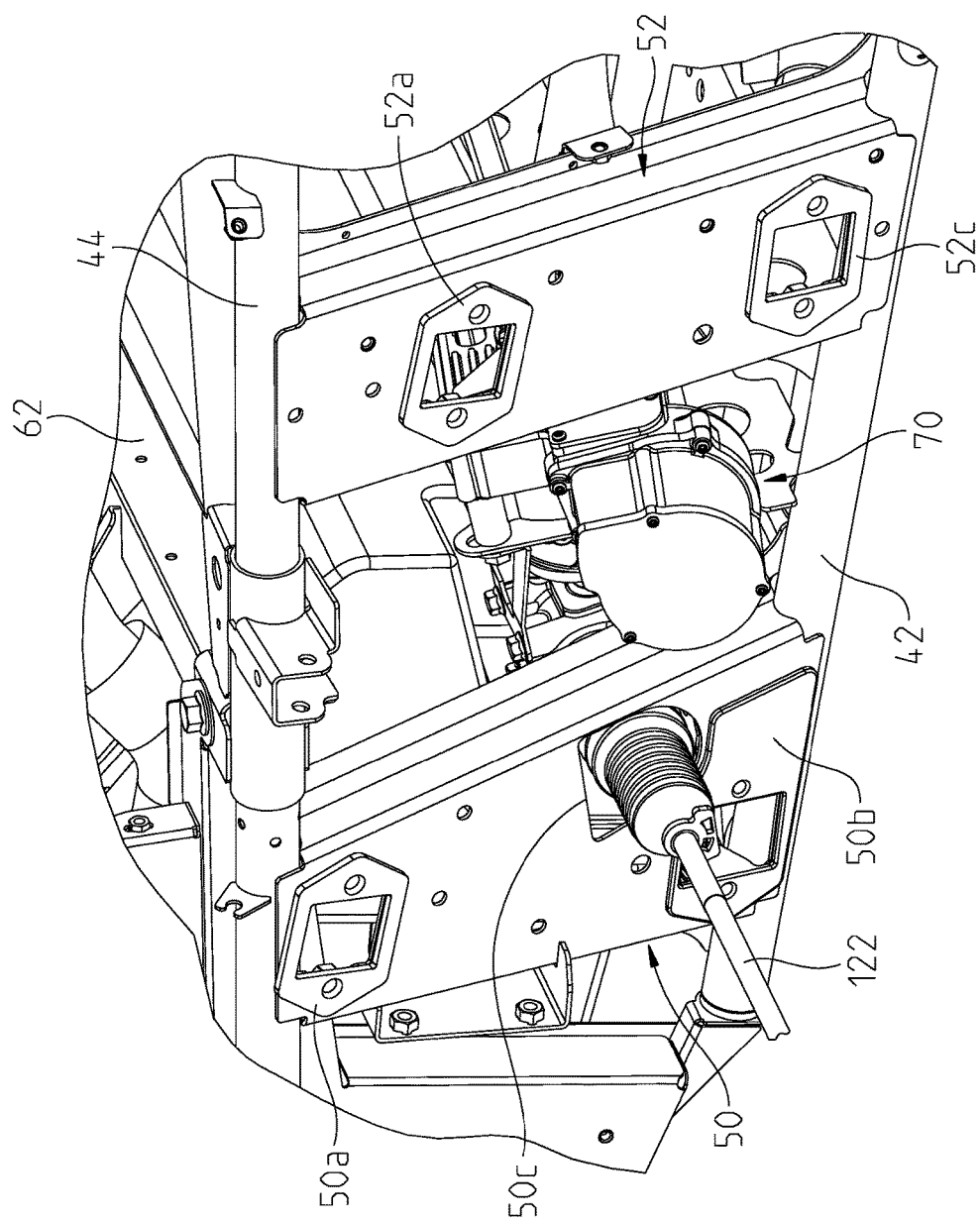
FIG. 10 is left rear perspective view of the front frame assembly.
Figure 11:
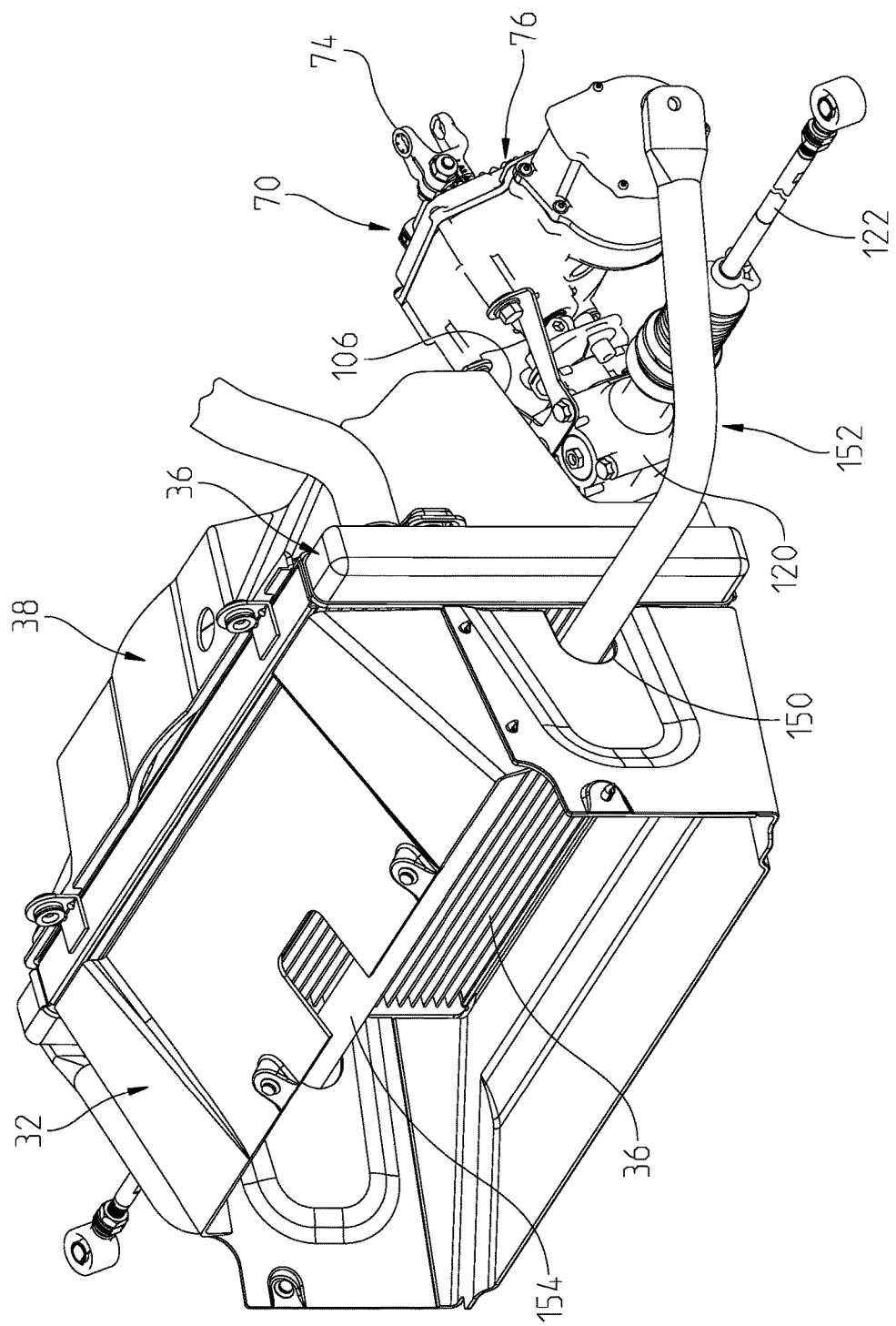
FIG. 11 is a left front perspective view of the cooling system.

With reference now to FIG. 9, cooling system 30 is shown coupled to the frame 4. Frame 4 includes a front frame portion or bulkhead 40 to which the cooling system 30 is coupled. As shown in FIG. 9, frame portion 40 is comprised of front lower tubes 42 and front upper tubes 44 extending rearwardly. A lower cross brace 46 extends between and structurally interconnects lower tubes 42. Wall portions 50 and 52 extend upwardly and couple together the front lower tubes 42 and front upper tubes 44, as best shown in FIG. 10. Wall portions 50 and 52 define coupling portions 50a, 50b and 52a and 52b for suspension arms, as more fully described in our U.S. Pat. Nos. 8,544,587; 8,695,746; 9,004,214, incorporated herein by reference. Wall portion 50 further includes an opening at 50c as more fully described herein.

With reference again to FIG. 9, frame 4 includes a mounting plate 60 and a removable crossbar 62. Crossbar 62 includes cantilever arms 64 which extend over the top of rear shroud 38 and couple radiator 36 thereto as shown best in FIGS. 9 and 16.

Figure 15:
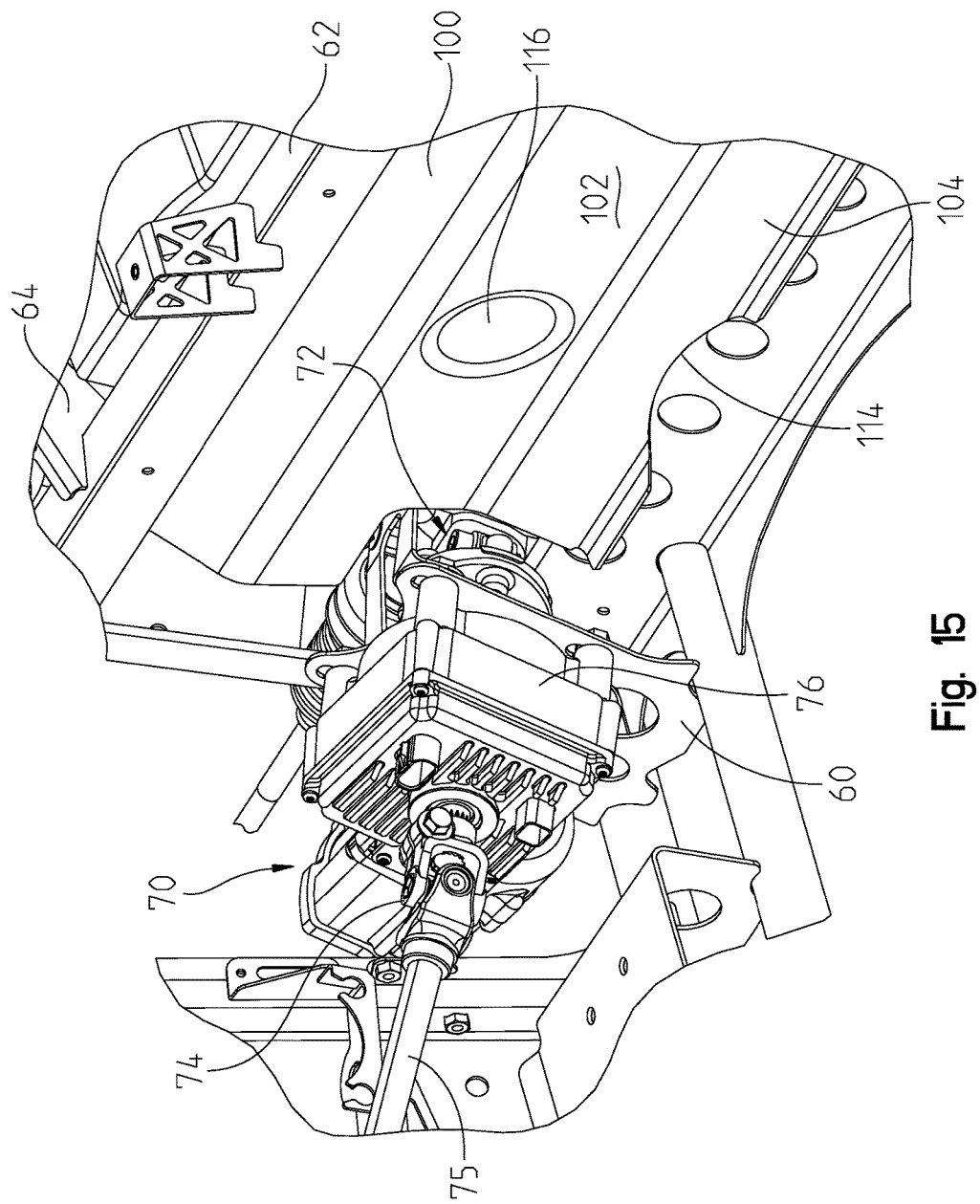
FIG. 15 is a right rear view of the rear shroud.

With reference now to FIGS. 10-12 and 15, a power steering system 70 will be described in greater detail. As shown, steering system 70 includes a rack and pinion system 72 (FIG. 12) secured to mounting plate 60 (FIG. 15). As shown, rack and pinion steering system 70 includes an input from a steering post 75 (FIG. 15) which in turn is connected to a U-joint 74 of steering motor 76. Motor 76 is coupled to a rear side of mounting plate 60 and rack and pinion 72 is coupled to a front side of mounting plate 60, as best shown in FIG. 15.

Figure 13:
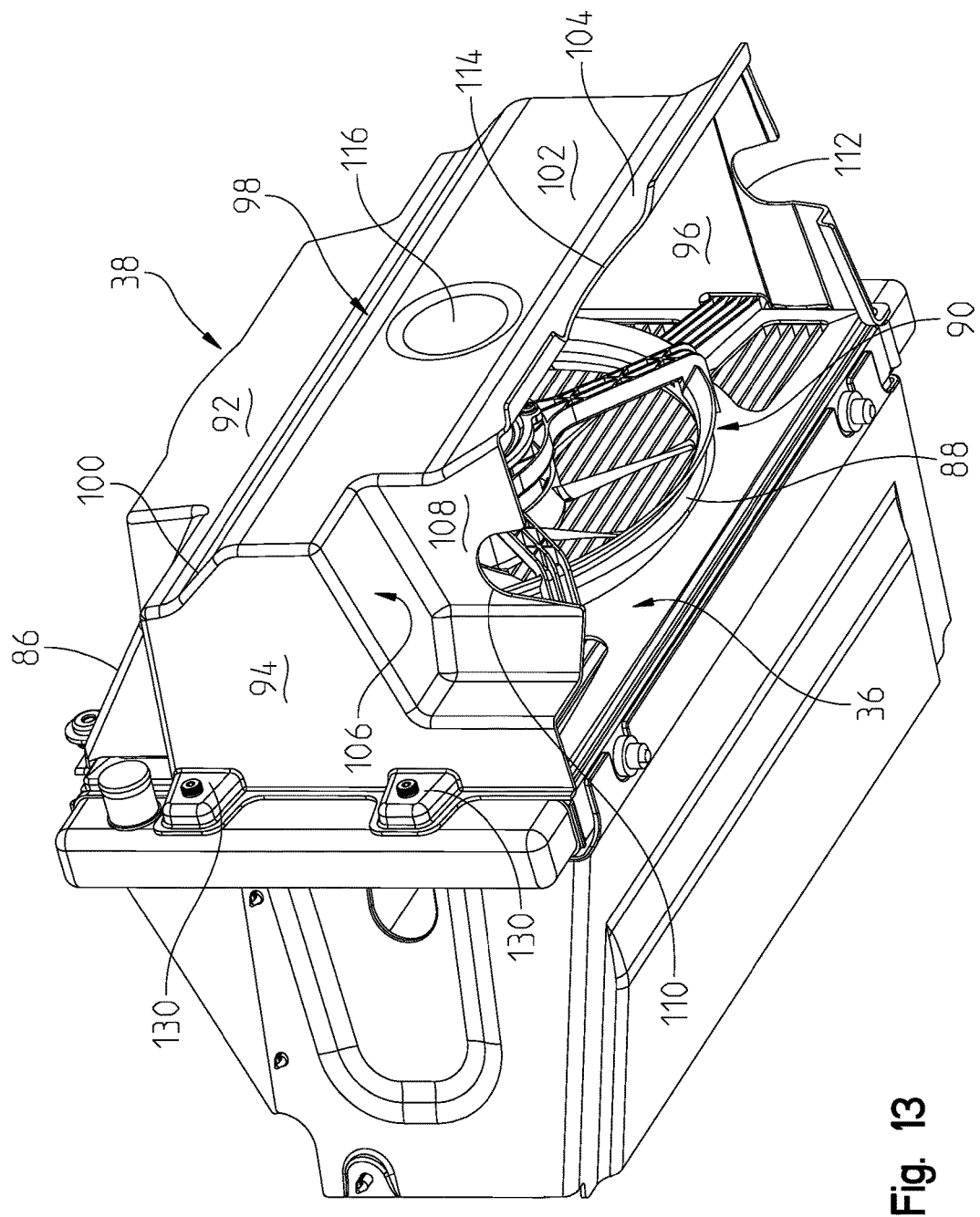
FIG. 13 is a right front underside perspective view of the cooling system.
Figure 14:
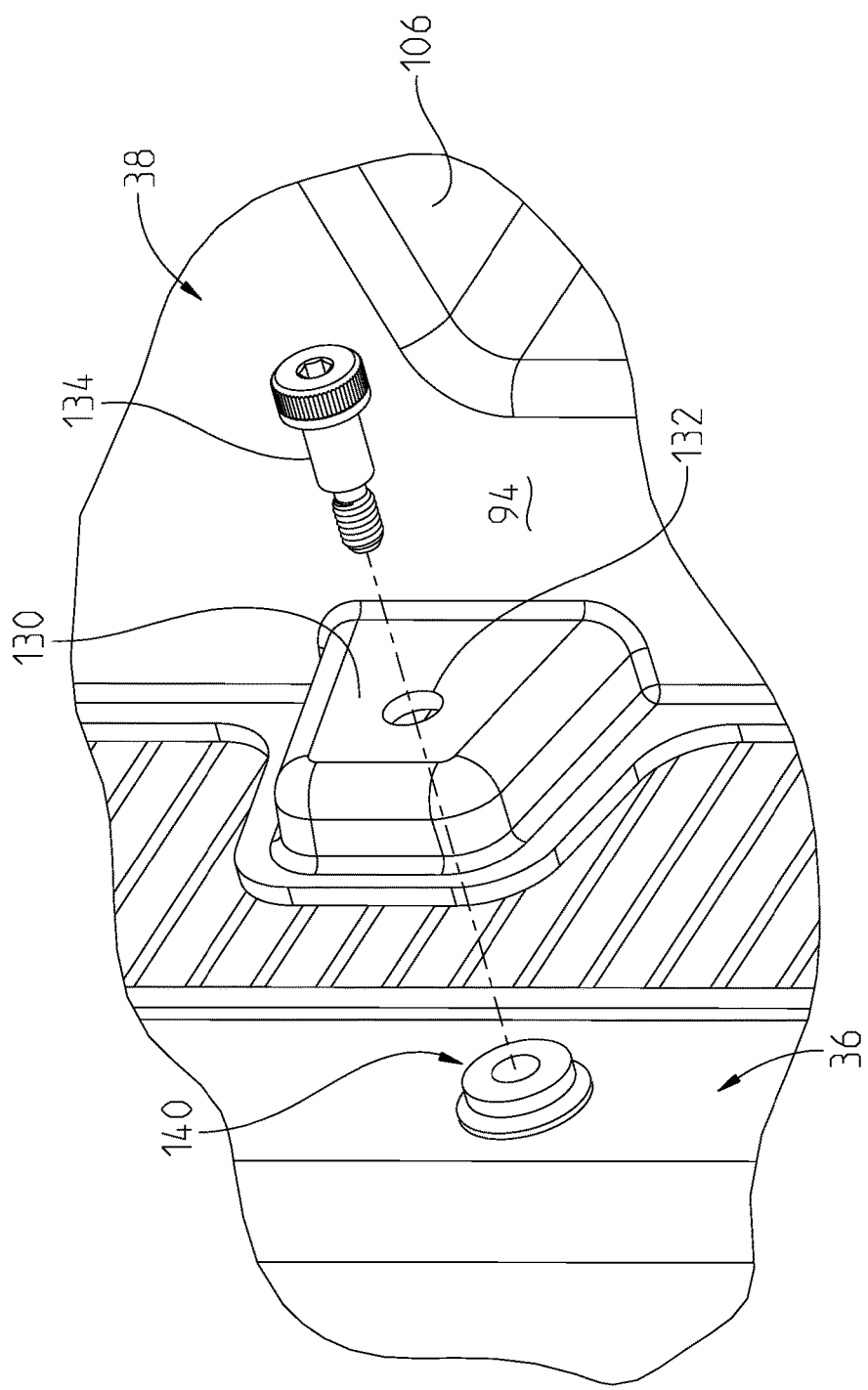
FIG. 14 is an enlarged view of the coupling of the rear shroud to the radiator.

With reference now to FIGS. 9, 13 and 14, rear shroud 38 will be described in greater detail. As shown in FIG. 9, shroud 38 includes a top wall 80 having a raised wall portion 82 with an arcuate portion 84. Arcuate portion provides clearance for fan guide 88 of fan 90 of radiator 36, as shown best in FIG. 13. Top wall 80 further includes inclined wall sections 86 providing clearance for cantilevered brackets 64. Top wall 80 further includes a rear wall section 92 providing clearance for removable crossbar 62.

With reference still to FIG. 13, rear shroud includes side walls 94, 96 which extend downwardly. A rear baffle plate 98 includes a curved wall section 100, wall portion 102 and a lower rearwardly angled portion 104. Rear shroud 38 further includes a recessed well at 106. Recessed well includes a sidewall 108 having a U-shaped opening 110, which cooperates with a U-shaped opening 112, as described herein. Furthermore, the rear shroud 38 includes an arcuate notch at 114 and a dimple at 116 for clearance purposes as described herein.

Figure 12:
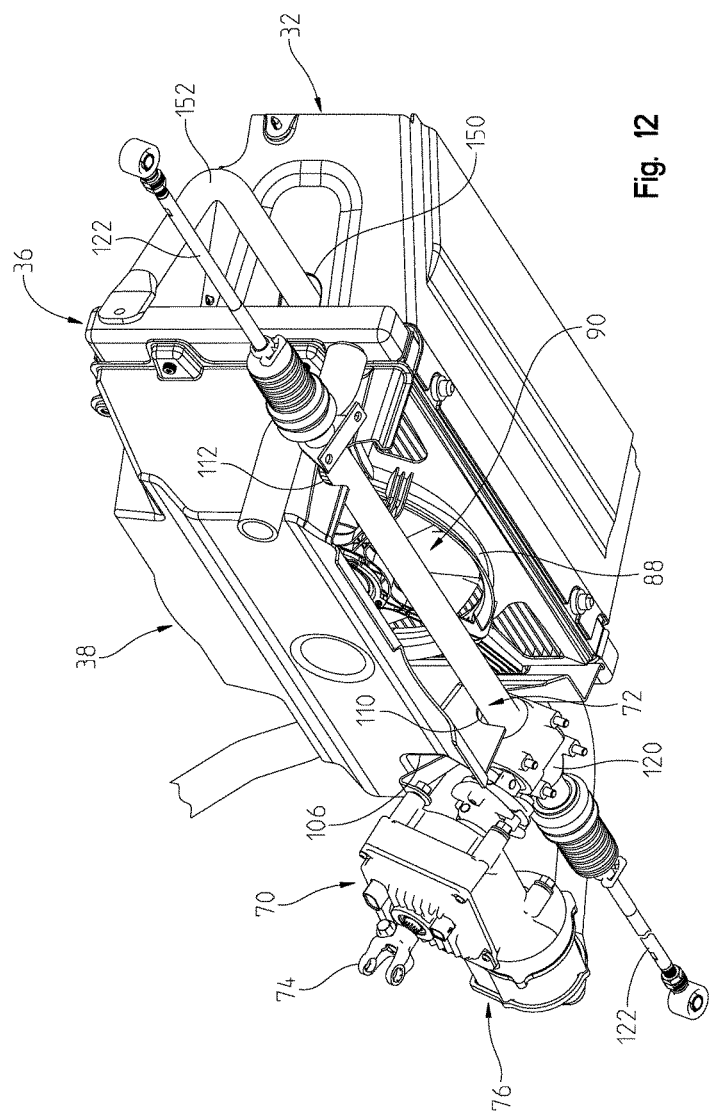
FIG. 12 is a left front underside perspective view of the cooling system.

As best shown in FIG. 12, the rack and pinion portion 72 includes a drive gear housing 120 which resides in the recessed well 106 and the rack and pinion portion 72 is positioned within the U-shaped openings 110, 112. The steering system 70 further includes tie rod ends 122. As shown in FIG. 10, tie rod ends 122 extend through apertures 50c to extend outwardly and connect to the front wheels for steering purposes.

As shown in FIGS. 13 and 14, rear shroud 38 includes flanges 130 positioned on each side thereof having an aperture at 132 (FIG. 14) for receiving a fastener such as a shoulder bolt 134. Radiator 36 includes a threaded boss at 140 (FIG. 14) for receiving the fastener 134, which in turn couples the rear shroud directly to the radiator. As also shown best in FIGS. 11 and 12, front shroud 32 includes U-shaped slots 150 for receipt of torsion bar 152 therethrough, where a portion 154 extends across the front of radiator 36.

Alternatively, the power steering unit could have the motor integrated into the rack and pinion portion, and the combination of the front shroud 32, radiator 36, and rear shroud 38 could be moved forwardly such that the lower rearwardly angled portion 104 is forward of the rack and pinion portion 72.

Figure 16:
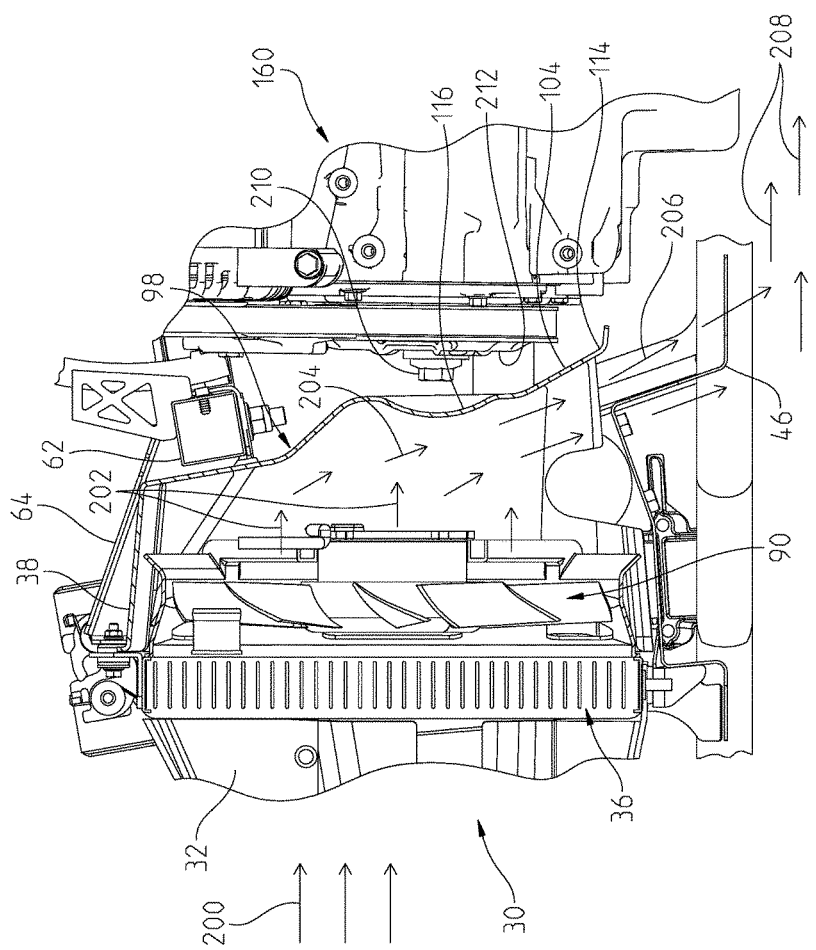
FIG. 16 is a cross sectional view through the cooling system and including the engine.

With reference now to FIG. 16, the operation of cooling system 30 will described in greater detail. As shown, the engine is a four cylinder in-line water cooled engine with the crankshaft extending parallel to the longitudinal direction of the vehicle (right to left) as viewed in FIG. 16. Cool air enters front shroud 32 at 200, and blows across cooling coils of the radiator as is known in the art. Radiator 36 is an air over water heat exchanger, and therefore cool air enters cooling system 30 by way of the vehicle moving and by way of the fan 90 drawing air through the radiator. As the air passes over the radiator 36, the water is cooled and air is heated. The hot air exits the fan 90 at 202, and is directed downwardly at 204, by virtue of the rear baffle plate 98. The air exits the rear shroud at 206, and then turns rearwardly at 208 by virtue of the lower rearwardly angled portion 104 of the rear baffle plate 98. The hot air continues rearwardly under the vehicle and extends under the engine 160 and the operator's compartment.

Figure 17:
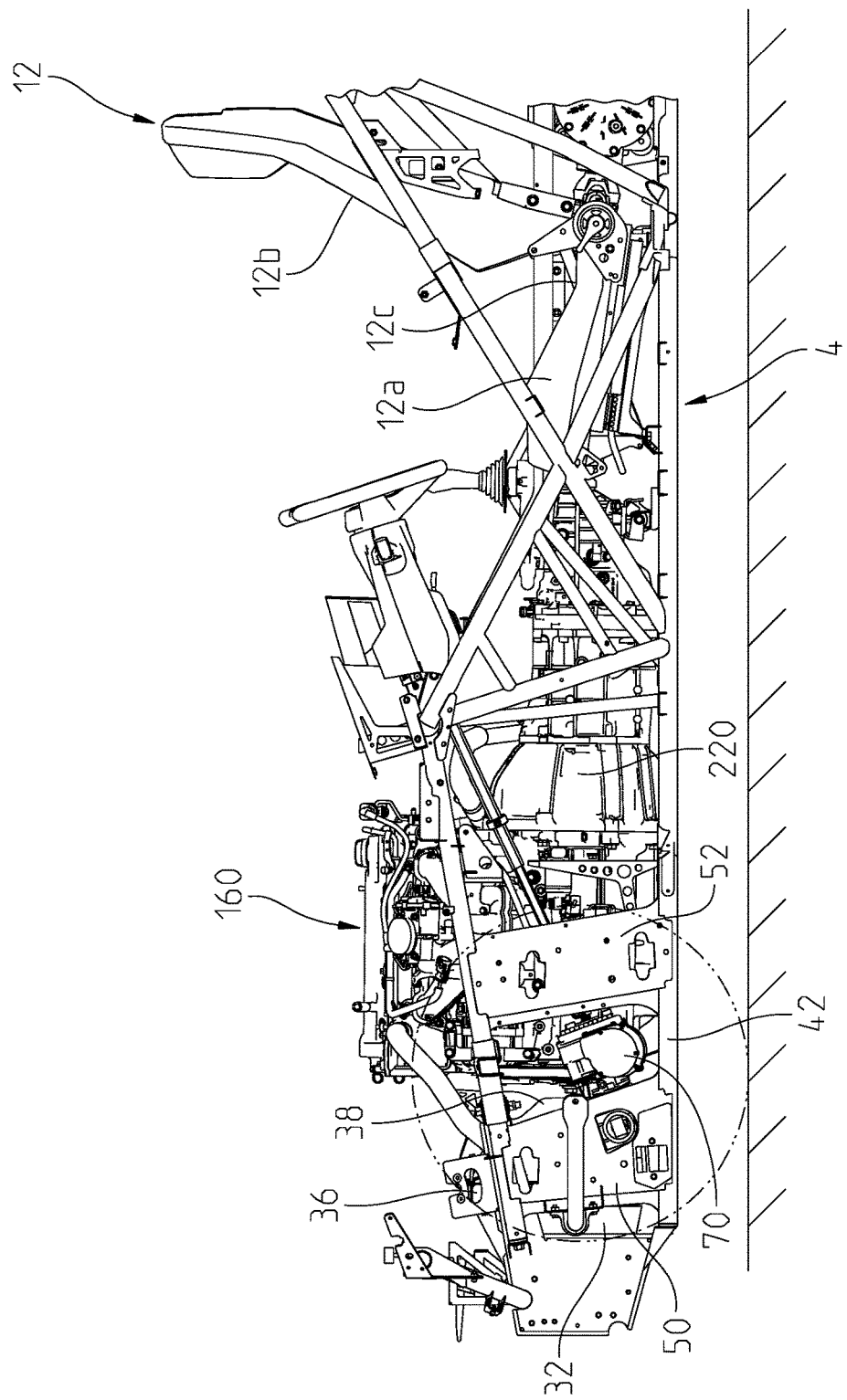
FIG. 17 is a side view of the vehicle without any of the body panels.

Due to the configuration of the vehicle, the riders are typically directly in line rearward of the engine. Thus, without the shroud, the air extends rearwardly over the engine picking up more heat and then is directed at the front wall of the operator's compartment. Some of that hot air finds its way into the operator's compartment, for example around the opening for the steering post 75. This is shown best in FIG. 17, where the vehicle is shown without any of the body panels, but the seat 12 is shown in side profile. Seat 12 has a seat bottom 12a and a seat back 12b where seat bottom 12a is shown having a low seat point 12c which is intermediate an uppermost point and lowermost point on the radiator 36, the engine 160 and the transmission 220. Thus, the rider would sit with the lowermost part of their torso at the low seat point 12c which places much of their body in direct line with the heat generated by the engine and transmission. Shroud 38 redirects that heat to go under the vehicle.

Thus, in the present application, the hot air exits the engine compartment through the bottom thereof and does not use the engine as a shroud. Also, because the radiator is flat, the rear shroud 38 can cover the entire back side of the radiator with the fan 90 positioned centrally on the radiator. Also by ducting the radiator air downward it creates negative pressure created in the engine compartment and helps to draw cool air through it. Because the vehicle is so low to the ground a vacuum pressure is created under the vehicle which also helps to suck the hot air downwardly and rearwardly. Due to the configuration of the engine compartment and the rear shroud, the rear shroud can be offered as a kit to retrofit existing vehicles.

As mentioned above, the rear shroud 38 provides a cooler operator's compartment than when not provided. The rear shroud 38 also provides a cooler engine compartment. In studies with and without shroud 38, at a vehicle speed of 60 miles per hour (MPH), the vehicle's engine compartment operates at a reduced temperature of 9-11 degrees Fahrenheit (9-11° F.) cooler than when no rear shroud is provided (depending on the location within the engine compartment). At a vehicle speed of 60 miles per hour (MPH), the vehicle operator's compartment operates at a reduced temperature of 15-20 degrees Fahrenheit (15-20° F.) cooler than when no rear shroud is provided (depending on the location within the operator's compartment).

The rear shroud 38 actually provides more dramatic results when the vehicle is moving slowly. At a vehicle speed of 5 miles per hour (MPH), the vehicle engine compartment operates at a reduced temperature of 15-45 degrees Fahrenheit (15-45° F.) cooler than when no rear shroud is provided (depending on the location within the engine compartment). At a vehicle speed of 5 miles per hour (MPH), the vehicle operator's compartment operates at a reduced temperature of 10-13 degrees Fahrenheit (10-13° F.) cooler than when no rear shroud is provided (depending on the location within the operator's compartment).

With reference still to FIG. 16, the rear shroud is positioned in the space rearward of the radiator 36 and forward of the engine. The shroud is forward of the removable crossbar 62. The dimple 116 provides operating clearance for the bolt 210 at the front of engine 160 which couples sheave 212 to the engine 160. The arcuate cutout 114 allows the clearance around the engine components, even though the lower rearwardly angled portion 104 has a rearwardmost point which is rearward of a forwardmost point of the engine 160.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
    two front wheels;
    at least one rear wheel;
    a frame supported by the two front wheels and the at least one rear wheel;
    an operator's compartment comprising side by side seats;
    an engine supported by the frame and positioned forward of the operator's compartment;
    a radiator positioned forward of the engine and coupled to the engine for cooling the engine;
    a front radiator shroud positioned over the radiator on a front side thereof;
    a rear radiator shroud positioned over the radiator on a rear side thereof, the rear radiator shroud having a rear baffle plate directing air downwardly and under the operators compartment; and
    a power steering unit wherein a rack and pinion portion extends within the rear radiator shroud.

2. The vehicle of claim 1, wherein the vehicle includes a front grate which allows air into the front radiator shroud.

3. The vehicle of claim 1, wherein the rear baffle plate of the rear radiator shroud includes a lower rearwardly angled portion.

4. The vehicle of claim 3, wherein the lower rearwardly angled portion has a rearwardmost point which is rearward of a forwardmost point of the engine.

5. The vehicle of claim 1, wherein the radiator is coupled to the frame and the rear radiator shroud is coupled to the radiator.

6. The vehicle of claim 1 wherein the electric power steering unit further comprises tie rod ends that extend from the rack and pinion portion and through the rear radiator shroud.

7. The vehicle of claim 6, wherein the electric power steering unit further comprises an electric motor positioned at one end of the rack and pinion portion.

8. The vehicle of claim 7, wherein the rear radiator shroud conforms to the electric power steering unit.

9. The vehicle of claim 6, wherein the frame is comprised of upper and lower longitudinally extending tubular portions which flank the radiator, and a wall portion extending vertically between the upper and lower tubular portions, the tie rods extending though openings in the wall portions.

10. A vehicle, comprising:
    two front wheels;
    at least one rear wheel;
    a frame supported by the two front wheels and the at least one rear wheel;
    an operator's compartment comprising side by side seats;
    an engine supported by the frame and positioned forward of the operator's compartment;
    a front body portion surrounding the engine and the frame, the front body portion having an opening therethrough adjacent a forwardmost point of the front body portion;
    a radiator positioned forward of the engine and rearward of the opening, and coupled to the engine for cooling the engine; and
    a rear radiator shroud positioned over the radiator on a rear side thereof, the rear radiator shroud having a rear baffle plate directing air downwardly and under the operators compartment wherein the rear baffle plate of the rear radiator shroud includes a lower rearwardly angled portion having a rearwardmost point which is rearward of a forwardmost point of the engine.

11. The vehicle of claim 1, wherein the power steering unit is an electric power steering unit.

12. The vehicle of claim 10, further comprising a front radiator shroud positioned over the radiator on a front side thereof and rearward of the opening.

13. The vehicle of claim 12, wherein the vehicle includes a front grate which allows air through the opening and into the front radiator shroud.

14. The vehicle of claim 10, wherein the radiator is coupled to the frame and the rear radiator shroud is coupled to the radiator.

15. The vehicle of claim 10, further comprising an electric power steering unit wherein a rack and pinion portion extends within the rear radiator shroud.

16. The vehicle of claim 15, wherein the electric power steering unit further comprises tie rod ends that extend from the rack and pinion portion and through the rear radiator shroud.

17. The vehicle of claim 15, wherein the electric power steering unit further comprises an electric motor positioned at one end of the rack and pinion portion.

18. The vehicle of claim 16, wherein the frame is comprised of upper and lower longitudinally extending tubular portions which flank the radiator, and a wall portion extending vertically between the upper and lower tubular portions, the tie rods extending though openings in the wall portions.

* * * * *